(12) United States Patent
Dingwall et al.

(10) Patent No.: US 9,767,776 B2
(45) Date of Patent: Sep. 19, 2017

(54) SUPPORT STAND FOR A MUSICAL INSTRUMENT

(71) Applicants: James Dingwall, Temecula, CA (US); John C. Nicoll, Temecula, CA (US)

(72) Inventors: James Dingwall, Temecula, CA (US); John C. Nicoll, Temecula, CA (US)

( * ) Notice: Subject to any disclaimer, the term of this patent is extended or adjusted under 35 U.S.C. 154(b) by 0 days.

(21) Appl. No.: 14/980,693

(22) Filed: Dec. 28, 2015

(65) Prior Publication Data
US 2017/0186410 A1 Jun. 29, 2017

(51) Int. Cl.
*G10D 3/00* (2006.01)
*G10G 5/00* (2006.01)
*F16M 11/04* (2006.01)

(52) U.S. Cl.
CPC ............. *G10G 5/00* (2013.01); *F16M 11/041* (2013.01)

(58) Field of Classification Search
CPC ............ G10G 5/00; G10G 5/005; G10G 7/00; G10G 7/005; G10G 7/02; G10D 13/026; G10D 1/085; G10D 3/00; G10D 13/06; G10D 1/08; G10D 3/18; G10D 13/00; G10D 3/003; G10D 3/163; G10D 13/065; G10D 3/02

USPC .... 248/154, 313, 316.6, 316.8, 346.04, 689; 84/327
See application file for complete search history.

(56) References Cited

U.S. PATENT DOCUMENTS

| | | | | |
|---|---|---|---|---|
| 6,015,121 A * | 1/2000 | Reid | .................. | A47F 7/00 248/150 |
| 6,416,029 B1 * | 7/2002 | Holtermanns | ....... | G10D 13/026 248/346.06 |
| 6,683,237 B2 * | 1/2004 | Christou | ................ | G10G 5/005 84/327 |
| 6,812,390 B2 * | 11/2004 | Kalbas | ..................... | G10G 5/00 84/327 |
| 7,375,269 B2 * | 5/2008 | Perkins | .................. | G10D 3/003 224/910 |
| 9,206,941 B2 * | 12/2015 | Smith | ..................... | F16M 11/04 |
| 2011/0290975 A1 * | 12/2011 | Lin | ........................ | F16M 11/28 248/346.04 |

* cited by examiner

*Primary Examiner* — Steven Marsh
(74) *Attorney, Agent, or Firm* — The Law Offices Of Eric W. Peterson

(57) ABSTRACT

A support stand for supporting a stringed instrument having a securing mechanism, a front compression plate having a leg portion, and a back compression plate having a leg portion, where the front compression plate engages the securing mechanism, the back compression plate engages the securing mechanism, and the support stand supports the instrument in a generally upright position when the support stand is placed on a surface.

19 Claims, 15 Drawing Sheets

SUPPORT STAND FOR A MUSICAL INSTRUMENT

BACKGROUND

A user of a stringed instrument desires to rest the instrument in an upright position between uses, for example, against a piece of furniture or a wall. An instrument stand is frequently used to support the instrument when not in use. However, current stands are often cumbersome and create logistic problems when used. These stands remain on the ground during use of the instrument, often become an obstacle to the user, and can cause logistic difficulties for the user when placing the instrument on the stand and removing the instrument from the stand.

SUMMARY OF THE INVENTION

The present disclosure pertains to a support stand for supporting a stringed instrument, said support stand having a securing mechanism, a front compression plate having a leg portion, and a back compression plate having a leg portion, where the front compression plate engages the securing mechanism, the back compression plate engages the securing mechanism, and the support stand supports the instrument in a generally upright position when the support stand is placed on a surface. One aspect of the disclosure is a support stand where the securing mechanism releasably secures the support stand to the guitar.

Another aspect of the disclosure is a support stand where the securing mechanism has a first compression mechanism and a second compression mechanism. Another aspect of the disclosure is a support stand where the first compression mechanism has a first receiving member, a first rod, and a first pin, where the first receiving member receives the first rod, and the first rod receives the first pin, and the second compression mechanism has a second receiving member, a second rod, and a second pin where the second receiving member receives the second rod, and the second rod receives the second pin. Another aspect of the disclosure is a support stand where the first receiving member has a first receiving stop. Another aspect of the disclosure is a support stand where the first compression mechanism has a first end and a second end and the second compression mechanism has a first end and a second end, where the front compression plate engages the first end of the first compression mechanism and the first end of the second compression mechanism, and the back compression plate engages the second end of the first compression mechanism and the second end of the second compression mechanism. Another aspect of the disclosure is a support stand where the front compression plate has a first opening and a second opening, said first opening receiving the first rod and said second opening receiving the second rod. Another aspect of the disclosure is a support stand where the first opening is positioned at the first end of the front compression plate, and the second opening is positioned at the second end of the front compression plate, the front compression plate having a first top prong, a first bottom prong, a second top prong, and a second bottom prong, said slot of the first rod receiving the first top prong.

Another aspect of the disclosure is a support stand further having a front pad and back pad, said front pad engages the front compression plate and said back pad engages the back compression plate.

Another aspect of the disclosure is a support stand where the front compression plate and back compression plate extend upwardly at an angle, where said angle of the front compression plate and back compression plate prevents the instrument from falling forward when placed on a surface. Another aspect of the disclosure is a support stand where the first compression mechanism and second compression mechanism are positioned at an angle from a plane substantially horizontal with the surface. Another aspect of the disclosure is a support stand where the first and second openings of the front compression plate are positioned at a first opening distance from the surface, the first and second openings of the back compression plate are positioned at a second opening distance from the surface, and the first opening distance is greater than the second opening distance.

Another aspect of the disclosure is a support stand having a support stand hole defined by the first compression mechanism, second compression mechanism, front compression plate, and back compression plate, where the support stand hole receives the instrument.

Another aspect of the disclosure is a support stand where the securing mechanism secures the support stand to the instrument when the instrument is lifted off the surface. Another aspect of the disclosure is a support stand where the support stand has a low profile when the support stand is engaged to the instrument thereby allowing for the user to play the instrument without the support stand inhibiting the user from playing the instrument.

With those and other objects, advantages and features on the invention that may become hereinafter apparent, the nature of the invention may be more clearly understood by reference to the following detailed description of the invention, the appended claims, and the drawings attached hereto.

BRIEF DESCRIPTION OF THE DRAWINGS

The accompanying drawings, which are incorporated herein and form part of the specification, illustrate various embodiments of the present invention and together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION

In the following detailed description, reference is made to the accompanying drawings which form a part hereof and in which is shown by way of illustration specific embodiments in which the invention may be practiced. These embodiments are described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

Figure 1A:
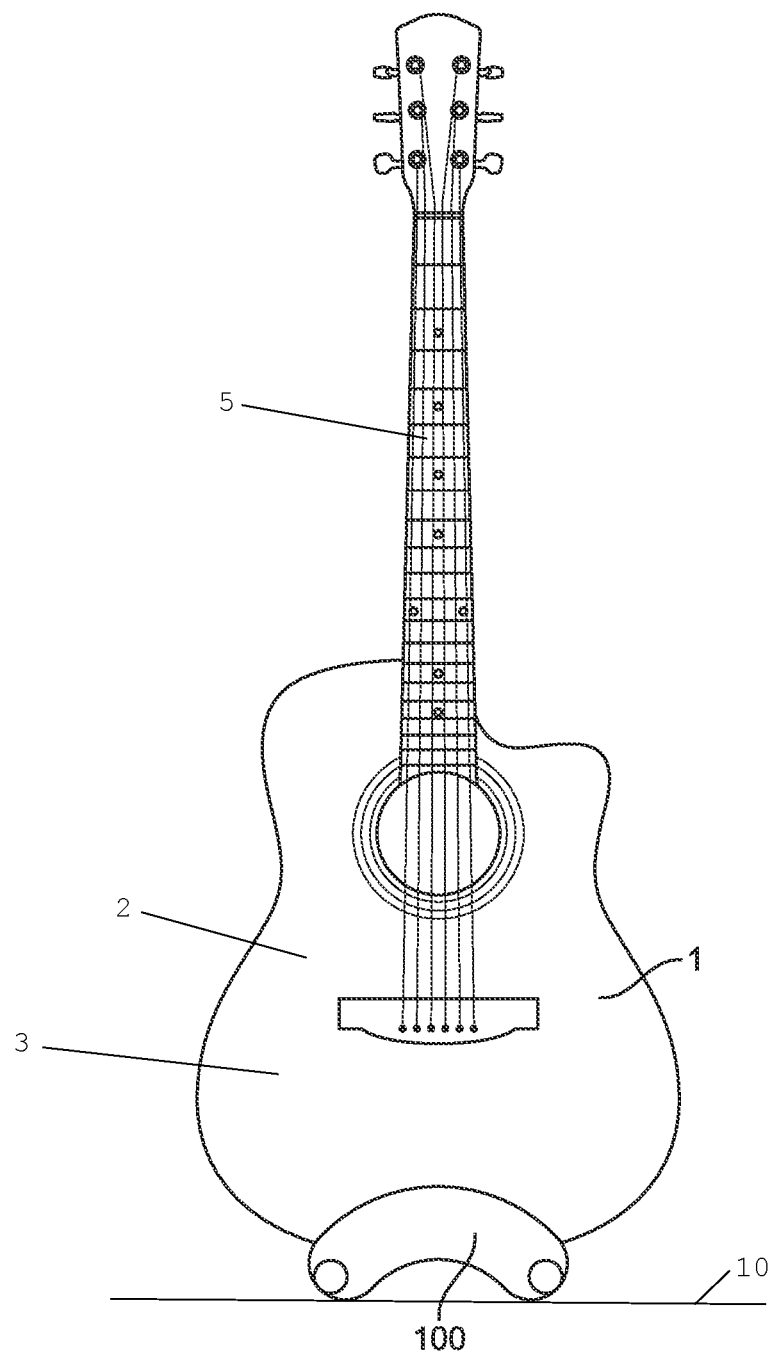
FIG. 1a is a perspective view of a support stand according to an exemplary embodiment.
Figure 1B:
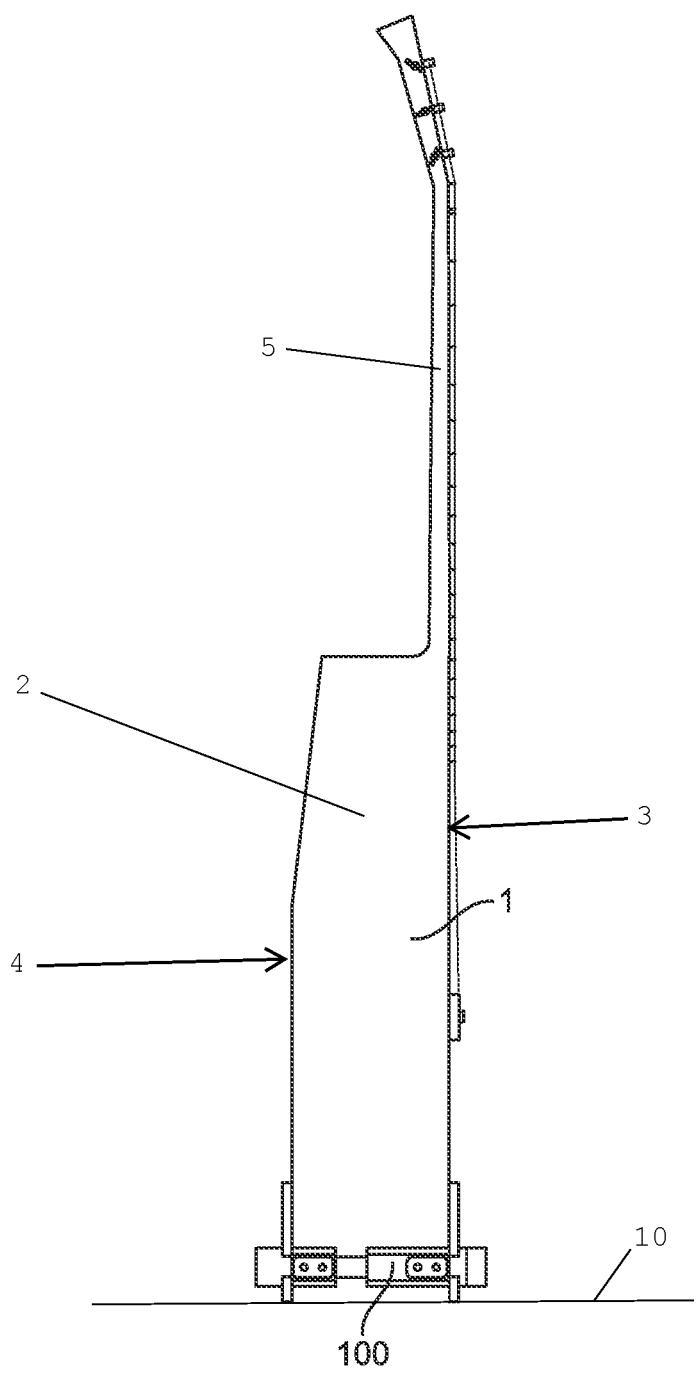
FIG. 1b is a perspective view of a support stand according to an exemplary embodiment.

The present disclosure pertains to a support stand 100 capable of supporting a stringed instrument 1, for example, without limitation, an acoustic guitar, electric guitar, bass guitar, ukulele, mandolin, cello, banjo, violin, or the like, in a generally upright position. For exemplar purposes, a guitar is used through this disclosure when referencing the instrument 1. This example is not meant to limit the function of the support stand 100 to a guitar, but can be applied to all stringed instruments 1. As shown in FIG. 1a-1b, for example, without limitation, guitar 1 includes a body 2 having a front surface 3 and a back surface 4, and a neck 5. The support stand 100 can be releasably secured to the guitar 1. The support stand 100 can have a compression plate and a securing mechanism.

Figure 2A:
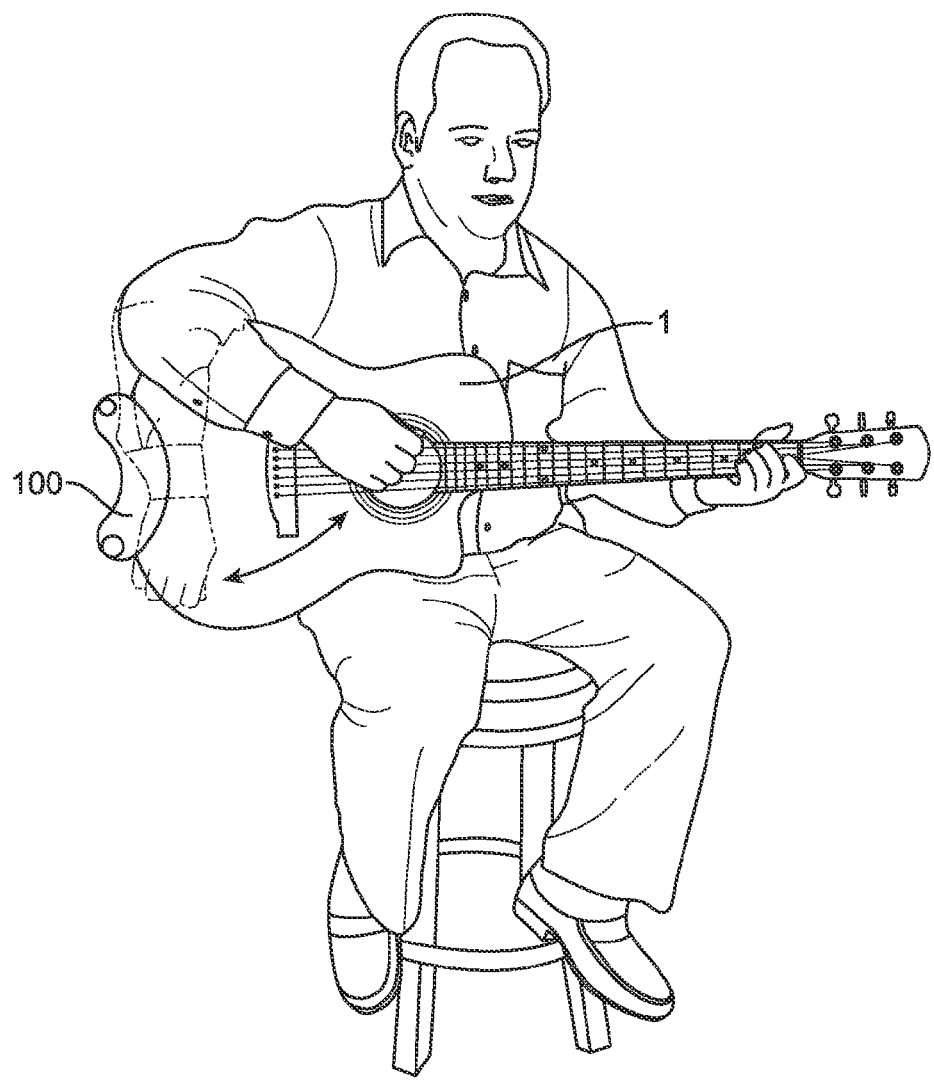
FIG. 2a is a perspective view of a support stand according to an exemplary embodiment.
Figure 2B:
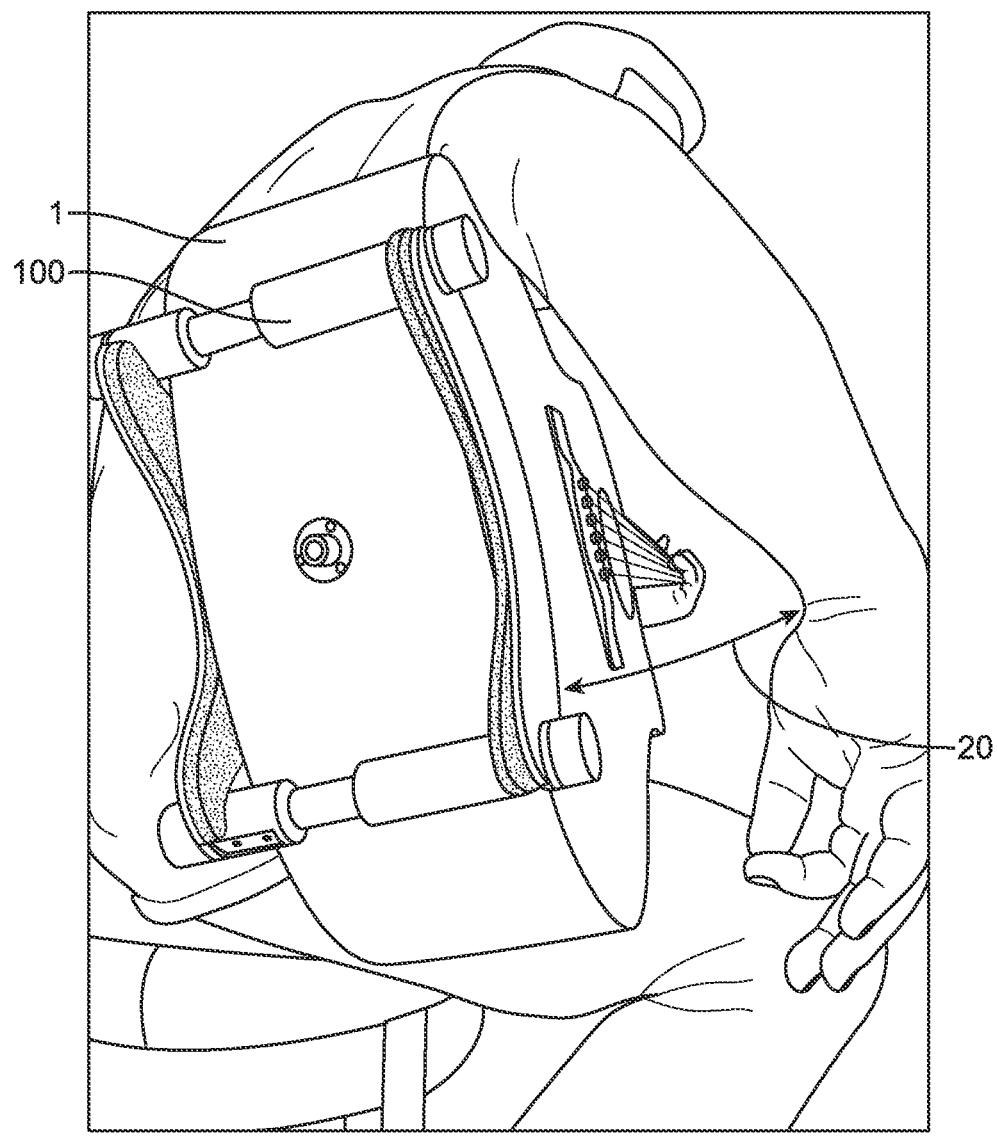
FIG. 2b is a perspective view of a support stand according to an exemplary embodiment.

In one embodiment, as shown in FIGS. 2a & 2b, the support stand remains secured to the guitar 1 when the guitar 1 is lifted off the surface 10. In one embodiment, as shown in FIGS. 2a & 2b, the guitar 1 is capable of being played while the support stand 100 remains engaged to the guitar 1. Upon picking up the guitar 1 from a resting position on the surface 10, the operator can play the guitar 1 without removing the support stand 100 from the guitar 1. When the support stand 100 is engaged to the guitar 1, the support stand 100 has a low profile in relation to the guitar 1. For example, without limitation, the support stand 100 does not protrude in a forward direction beyond a distance that would prevent or hinder the operator from playing or strumming the guitar 1. In one embodiment, where the support stand 100 is engaged to the guitar 1 and an operator is strumming the guitar 1, the support stand 100 allows for a gap 20 between the arm of the operator and the support stand 100. Upon completion of playing the guitar 1, the operator can place the guitar 1 with the support stand 100 engaged to the guitar 1 back onto the surface 10 in an upright resting position.

The securing mechanism is capable of securing the support stand 100 to the guitar 1 when the support stand 100 is resting on the surface 10 and/or lifted off the surface 10. In one embodiment, the support stand 100 is releasably secured to the guitar 1. The securing mechanism can be any mechanism for securing a stand to an instrument 1, for example, a compression mechanism, suction mechanism, a form of adhesive, or the like. While the support stand 100 can have any number of compression mechanisms, for exemplar purposes, without the intention to limit the scope of this disclosure, a support stand 100 with a first compression mechanism 200 and a second compression mechanism 300 will be disclosed.

As shown in FIGS. 3-10, the first compression mechanism 200 can have first receiving member 210, a first rod 220, and a first pin 230. The first receiving member 210 has a first receiving cavity 211 allowing for the first receiving member 210 to receive the first rod 220. The first receiving cavity 211 can be substantially positioned in the longitudinal axial center of the first rod 220. The first receiving cavity 211 can have a substantially similar shape as the shape of the first rod 220. The fit between the first rod 220 and the first receiving cavity 211 can be a clearance fit with a narrow tolerance or allowance to allow the first rod 220 to move freely within the first receiving cavity 211. While the first receiving cavity 211 is preferably cylindrically shaped where the first rod 220 is a cylinder, the first receiving cavity 211 can be any shape corresponding to the exterior shape of the first rod 220, for example, without limitation, square bar, triangular, rectangular, or the like.

The first rod 220 can have a first rod cavity 221 capable of receiving the first pin 230. The first rod cavity 221 can be positioned in the longitudinal axial center of the first rod 220. The first rod cavity 221 can be threaded for receiving a threaded first pin 230. The first receiving member 210 can have a first receiving passageway 223 capable of receiving the first pin 230. The fit between the first pin 230 and the first receiving passageway 223 can be a clearance fit with a narrow tolerance or allowance to allow the first pin 230 to move freely within the first receiving passageway 223. In one embodiment, the first receiving passageway 223 can be threaded for receiving a threaded first pin 230. The first pin 230 can have a first knob 231 allowing for the threaded first pin 230 to be screwed into the threaded first rod cavity 221. The diameter of the first knob 231 can be greater than the diameter of the first receiving passageway 223 where, when the first pin 230 passes through the first receiving passageway 223 and is threaded into the first rod cavity 221, the end surface 232 of the first knob 231 touches the end surface 212 of the first receiving member 210. The threading of the first pin 230 into the first rod cavity 221 causes the first knob 231 to exert a force onto the end surface 212 of the first receiving member 210 thereby pushing the first receiving member 210 causing it to traverse in the direction toward the first rod 220, or stated another way, thereby pulling the first rod 220 into the first receiving cavity 211.

Figure 7:
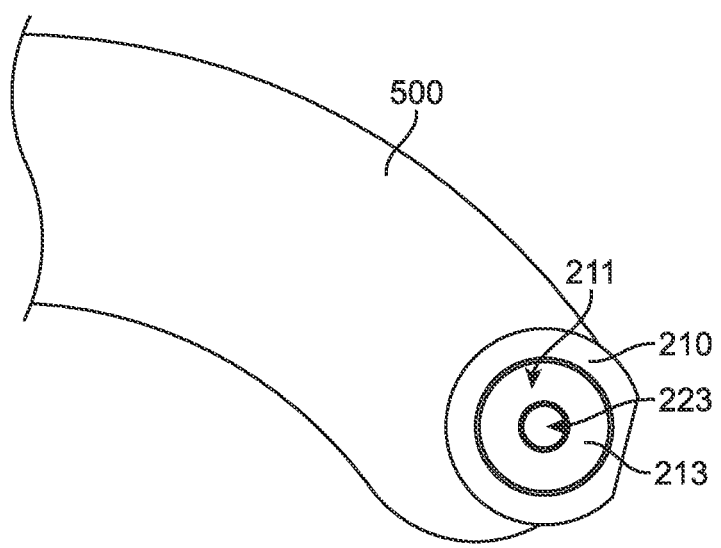
FIG. 7 is a side view of a receiving member according to an exemplary embodiment.

In one embodiment, as shown in FIG. 7, the first receiving member 210 can have a first receiving stop 213 for preventing the first rod 220 from completely sliding into the first receiving member 210. The first receiving stop 213 can be position within the first receiving cavity 211. The first receiving passageway 223 can extend through the first receiving stop 213. The first receiving stop 213 can be a shelf or surface protruding from the inner wall of the first receiving member 210 into the first receiving cavity 211.

The second compression mechanism 300 can have second receiving member 310, a second rod 320, and a second pin 330. The second receiving member 310 has a second receiving cavity 311 allowing for the second receiving member 310 to receive the second rod 320. The second receiving cavity 311 can be substantially positioned in the longitudinal axial center of the second rod 320. The second receiving cavity 311 can have a substantially similar shape as the shape of the second rod 320. The fit between the second rod 320 and the second receiving cavity 311 can be a clearance fit with a narrow tolerance or allowance to allow the second rod 320 to move freely within the second receiving cavity 311. While the second receiving cavity 311 is preferably cylindrically shaped where the second rod 320 is a cylinder, the second receiving cavity 311 can be any shape corresponding to the exterior shape of the second rod 320, for example, without limitation, square bar, triangular, rectangular, or the like.

The second rod 320 can have a second rod cavity 321 capable of receiving the second pin 330. The second rod cavity 321 can be positioned in the longitudinal axial center of the second rod 320. The second rod cavity 321 can be threaded for receiving a threaded second pin 330. The second receiving member 310 can have a second receiving passageway 323 capable of receiving the second pin 330. The fit between the second pin 330 and the second receiving passageway 323 can be a clearance fit with a narrow tolerance or allowance to allow the second pin 330 to move freely within the second receiving passageway 323. In one embodiment, the second receiving passageway 323 can be threaded for receiving a threaded second pin 330. The second pin 330 can have a second knob 331 allowing for the threaded second pin 330 to be screwed into the threaded second rod cavity 321. The diameter of the second knob 331 can be greater than the diameter of the second receiving passage 323 where, when the second pin 330 passes through the second receiving passageway 323 and is threaded into the second rod cavity 321, the end surface 332 of the second knob 331 touches the end surface 312 of the second receiving member 310. The threading of the second pin 330 into the second rod cavity 321 causes the second knob 331 to exert a force onto the second end surface 312 of the second receiving member 310 thereby pushing the second receiving member 310 causing it to traverse in the direction toward the second rod 320, or stated another way, thereby pulling the second rod 320 into the second receiving cavity 311.

Figure 8:
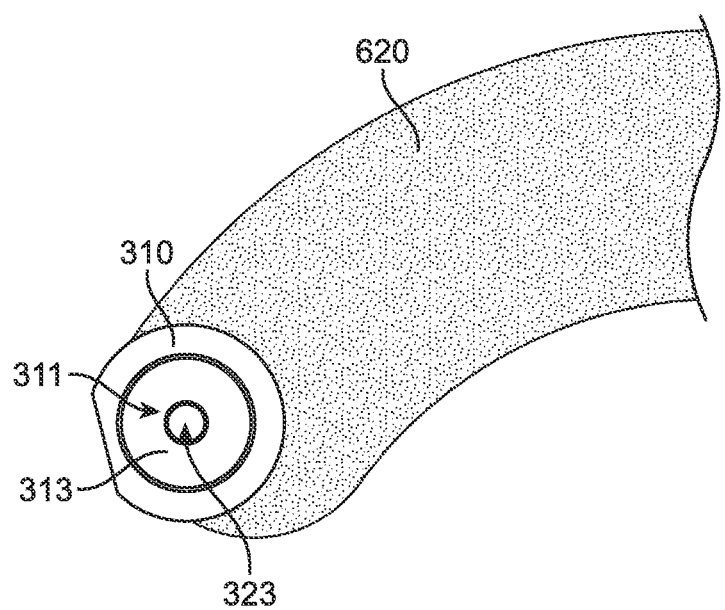
FIG. 8 is a side view of a receiving member according to an exemplary embodiment.
Figure 9:
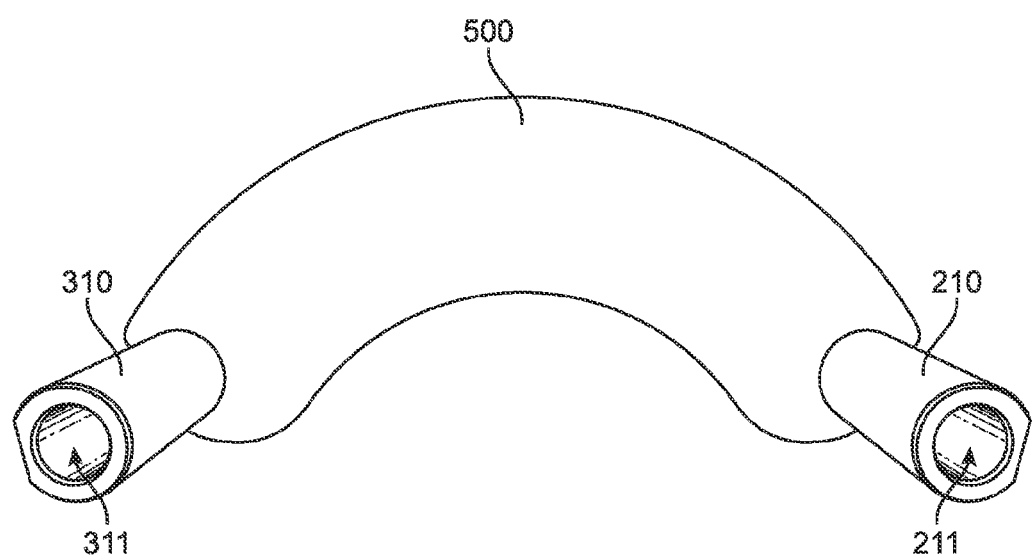
FIG. 9 is a side view of a first receiving member and second receiving member according to an exemplary embodiment.
Figure 10:
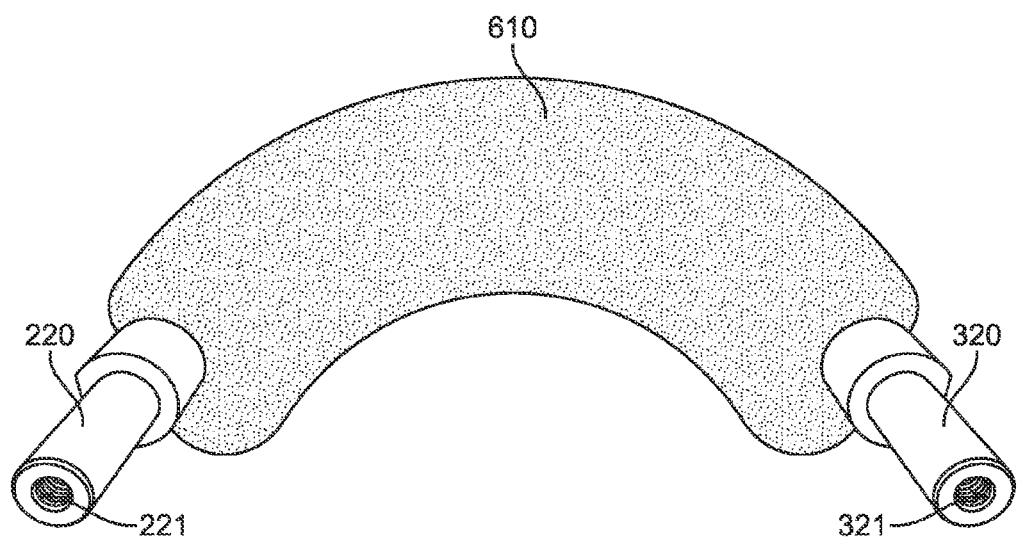
FIG. 10 is a side view of a first rod and a second rod according to an exemplary embodiment.

In one embodiment, as shown in FIG. 8, the second receiving member 310 can have a second receiving stop 313 for preventing the second rod 320 from completely sliding into the second receiving member 310. The second receiving stop 313 can be position within the second receiving cavity 311. The second receiving passageway 323 can extend through the second receiving stop 313. The second receiving stop 312 can be a shelf or surface protruding from the inner wall of the second receiving member 310 into the second receiving cavity 311.

Figure 3:
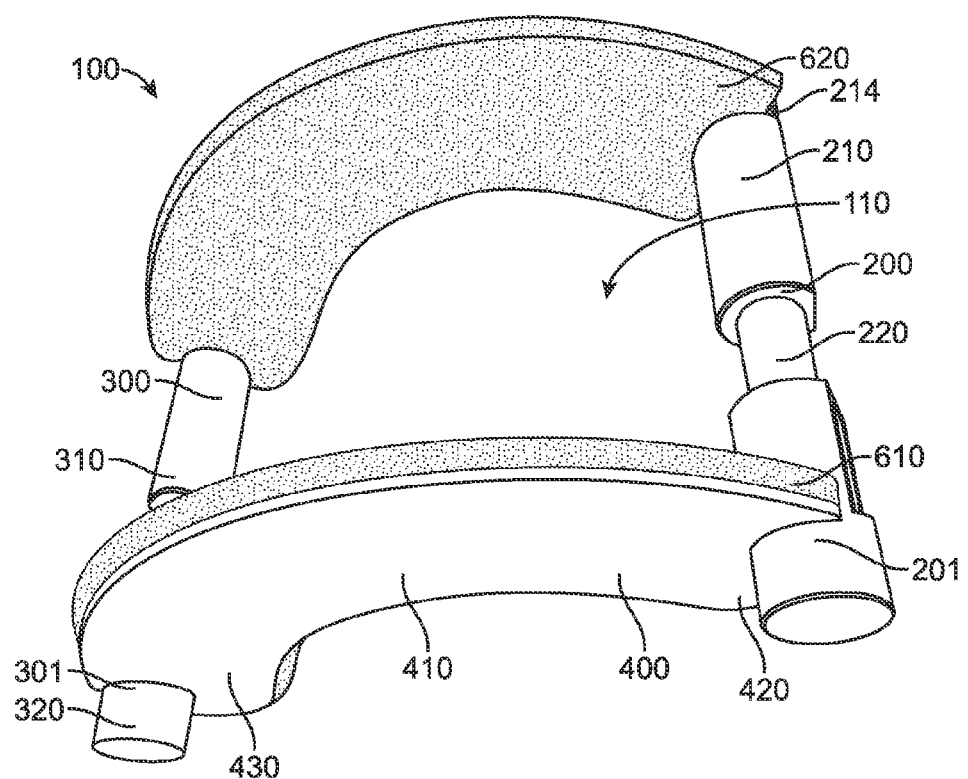
FIG. 3 is a perspective view of a support stand according to an exemplary embodiment.

The compression plate can allow for the support stand 100 to engage the guitar 1. While the support stand 100 can have any number of compression plates, for example, without the intention to limit the scope of this disclosure, a support stand 100 with two compression plates, a front compression plate 400 and a back compression plate 500 is disclosed. The inside surface of the front compression plate 400 can releasably engage or be compressed onto the front surface 3 of the guitar 1. The inside surface of the back compression plate 500 can releasably engage or be compressed onto the back surface 4 of the guitar 1. While the front compression plate 400 and a back compression plate 500 preferably have the shape of a rectangular arch as shown in FIG. 3, the front compression plate 400 and a back compression plate 500 can be any shape capable of allowing the support stand 100 to engage the guitar 1, for example, without limitation, a triangle, square, rectangle, oval, circle, polygon, designs, or the like.

The front compression plate 400 can have a body portion 410 and at least one leg portion. The front compression plate 400 preferably has a first leg portion 420 and a second leg portion 430. While the first and second leg portions 420, 430 are preferably located at ends 401, 402 of the front compression plate 400, respectively, the first and second leg portions 420, 430 can be located at any position on the front compression plate 400, for example, the middle, or the like.

The back compression plate 500 can have a body portion 510 and at least one leg portion. The back compression plate 500 preferably has a first leg portion 520 and a second leg portion 530. While the first and second leg portions 520, 530 are preferably located at ends 501, 502 of the back compression plate 500, respectively, the first and second leg portions 520, 530 can be located at any position on the back compression plate 500, for example, the middle, or the like.

In one embodiment, the front compression plate 400 or back compression plate 500 can engage the first end 201 of the first compression mechanism 200 and first end 301 of the second compression mechanism 300. Where the front compression plate 400 engages the first end 201 of the first compression mechanism 200 and the first end 301 of the second compression mechanism 300, the back compression plate 500 engages the second end 202 of the first compression mechanism 200 and the second end 302 of the second compression mechanism 300. The front compression plate 400 or back compression plate 500 can engage the first receiving member 210, second receiving member 310, first rod 220, and second rod 320.

Figure 4:
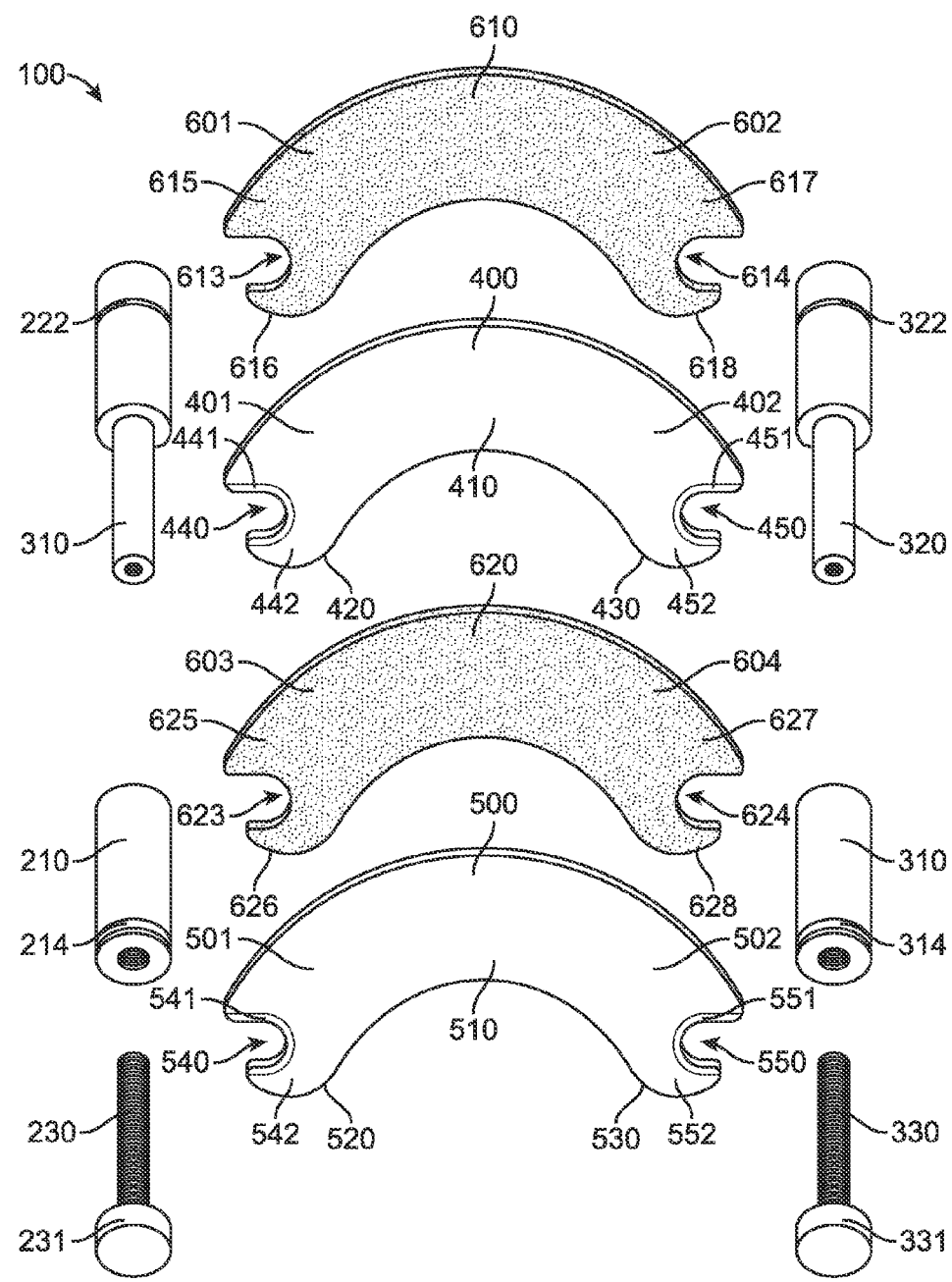
FIG. 4 is an exploded view of a support stand according to an exemplary embodiment.
Figure 5:
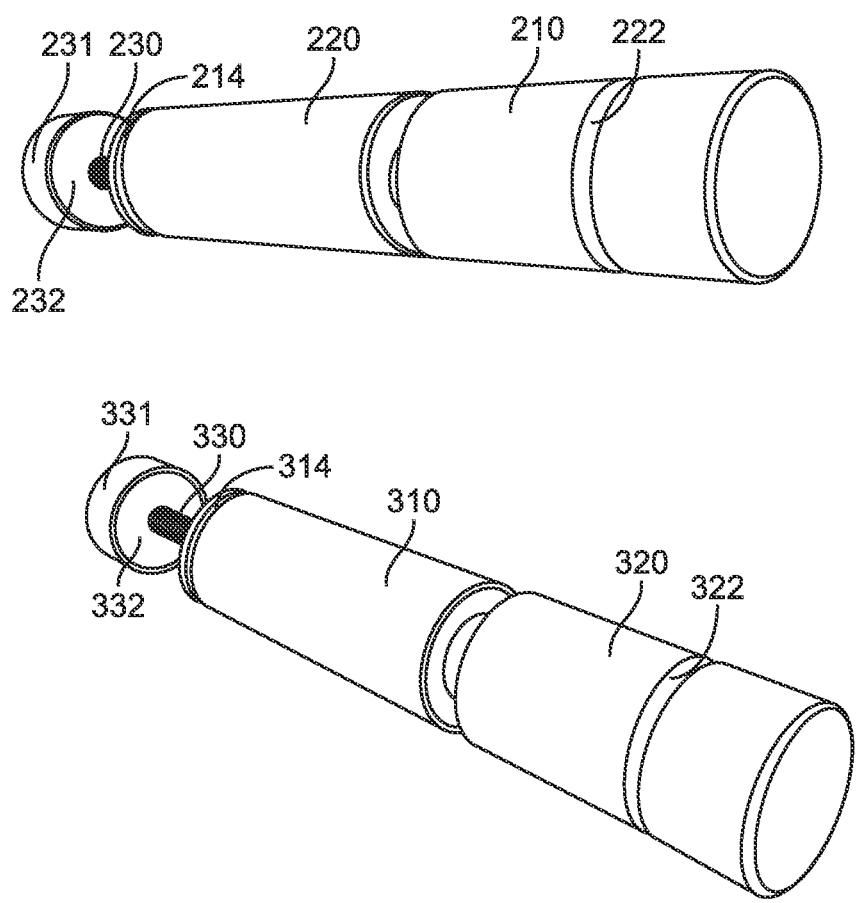
FIG. 5 is a perspective view of two securing mechanisms according to an exemplary embodiment.
Figure 6:
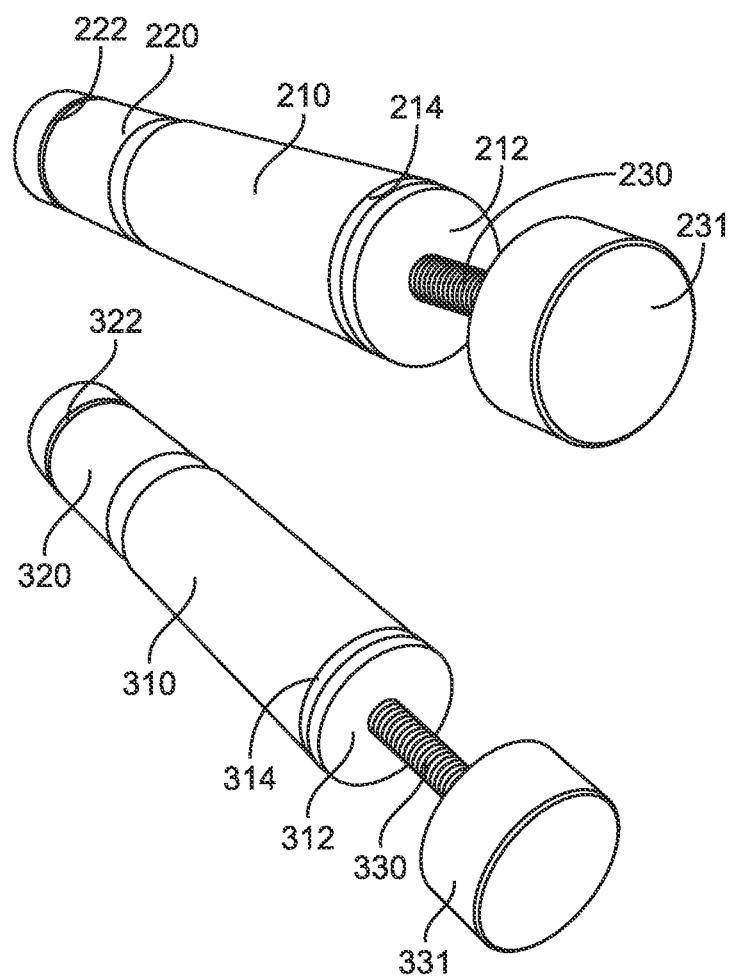
FIG. 6 is a perspective view of two securing mechanisms according to an exemplary embodiment.

In one embodiment, where the front compression plate 400 engages the first rod 220, the front compression plate 400 has a first opening 440 capable of receiving a first rod 220. The first opening 440 can be position at first end 401 of the front compression plate 400. In one embodiment, as shown in FIG. 4, the front compression plate 400 can be bifurcated having a first top prong 441 and a first bottom prong 442 and an interior surface defining the first opening 440. Here, the first rod 220 can have a slot 222 having an interior surface, where the slot 222 extends circumferentially about the exterior surface of the first rod 220. The slot 222 can receive the first top prong 441 and/or a first bottom prong 442.

In one embodiment, where the front compression plate 400 engages the second rod 320, the front compression plate 400 has a second opening 450 capable of receiving a second rod 320. The second opening 450 can be position at second end 402 of the front compression plate 400. In one embodiment, as shown in FIG. 4, the front compression plate 400 can be bifurcated having a second top prong 451 and a second bottom prong 452 and an interior surface defining the second opening 450. Here, the second rod 320 can have a slot 322 having an interior surface, where the slot 322 extends circumferentially about the exterior surface of the second rod 320. The slot 322 can receive the second top prong 451 and/or a second bottom prong 452.

In one embodiment, where the back compression plate 500 engages the first receiving member 210, the back compression plate 500 has a first opening 540 capable of receiving a first receiving member 210. The first opening 540 can be position at end 501 of the back compression plate 500. In one embodiment, as shown in FIG. 4, the back compression plate 500 can be bifurcated having a first top prong 541 and a first bottom prong 542 and an interior surface defining the first opening 540. Here, the first receiving member 210 can have a slot 214 having an interior surface, where the slot 214 extends circumferentially about the exterior surface of the first receiving member 210. The slot 214 can receive the first top prong 541 and a first bottom prong 542.

In one embodiment, where the back compression plate 500 engages the second receiving member 310, the back compression plate 500 has a second opening 550 capable of receiving a second receiving member 310. The second opening 550 can be position at end 502 of the back compression plate 500. In one embodiment, as shown in FIG. 4, the back compression plate 500 can be bifurcated having a second top prong 551 and a second bottom prong 552 and an interior surface defining the second opening 550. Here, the second receiving member 310 can have a slot 314 having an interior surface, where the slot 314 extends circumferentially about the exterior surface of the second receiving member 310. The slot 314 can receive the second top prong 551 and a second bottom prong 552.

In one embodiment, the first and second leg portions 420, 430, 520, 530 can stabilize the support stand 100 where the guitar 1 is placed in an upright position on a surface 10 such as a floor or other flat surface. The first and second leg portions 420, 430, 520, 530 can extend beyond the base of the guitar 1 where the support stand 100 receives or engages to the guitar 1. This can allow for the first and second leg portions 420, 430, 520, 530 to touch the surface 10 when resting on a surface 10 in the upright position and/or the guitar 1 to be raised above the surface 10. For example, where the support stand 100 has first and second leg portions 420, 430, 520, 530, the support stand 100 rests on the legs when the guitar 1 is placed on a surface 10 in an upright position thereby preventing the guitar 1 from touching the surface 10. This is similar to the legs of a table supporting a table top.

In one embodiment, the leg portions 420, 430, 520, 530 can each have a stabilizing member (not shown) for providing further support when the guitar 1 is placed in an upright position. The stabilizing member can diminish the likelihood of the guitar 1 from falling over. The stabilizing member can engage the base of leg portions 420, 430, 520, 530 and extend laterally toward the front and/or back of the support stand 100.

In one embodiment, the front compression plate 400 and/or back compression plate 500 can have at least one extension (not shown) for stabilizing the support stand 100 where the guitar 1 is placed in an upright position on a surface 10 such as a floor or other flat surface. The extension can be a rod, tube, or plate, that extends from the front compression plate 400 and/or back compression plate 500 away from the support stand in a substantially horizontal orientation. In one embodiment, one end of the extension engages the front compression plate 400 and/or back compression plate 500. In one embodiment, one end of the extension releasably engages the front compression plate 400 and/or back compression plate 500, thereby allowing the extension to become detached from the front compression plate 400 and/or back compression plate 500. In one embodiment, one end of the extension can engage or releasably engage the first and/or second leg portions 420, 430, 520, 530.

In one embodiment, the support stand 100 can have a pad for preventing damage to the guitar 1, such as, scratching, denting, or the like. In one embodiment, the support stand 100 can have a pad for each compression plate. Where the support stand 100 has a front and back compression plate 400, 500, the support stand 100 can have a front pad 610 for engaging the front compression plate 400 and a back pad 620 for engaging the back compression plate 500. The front pad 610 can have a backing member for providing support to the front pad 610 and a padded member for providing cushion to the front pad 610 where the padded member engages the interior surface of the backing member. The back pad 620 can have a backing member for providing support to the back pad 620 and a padded member for providing cushion to the back pad 620 where the padded member engages the interior surface of the backing member. The padded members can be made of any material that can prevent damage, for example, without limitation, gel pad, fabric, foam, or the like. The exterior surface of the backing members can releasably engage or touch the interior surface of the front compression plate 400 or back compression plate 500. While the front and back pad 610, 620 preferably have the shape of a rectangular arch as shown in FIG. 4, the front and back pad 610, 620 can be any shape capable of allowing the support stand 100 to engage the guitar 1, for example, without limitation, a triangle, square, rectangle, oval, circle, polygon, designs, or the like. In one embodiment, the shape of the front and back pad 610, 620 can correspond to the shape of a compression plate.

In one embodiment, the front pad 610 can engage the first and second compression mechanism 200, 300. The front pad 610 can have a first opening 613 capable of receiving a first compression mechanism 200 and a second opening 614 capable of receiving a second compression mechanism 300. The first opening 613 can be positioned at end 601 of the front pad 610 and the second opening 614 can be positioned at end 602 of the front pad 610. In one embodiment, as shown in FIG. 4, the front pad 610 can be bifurcated having a first top prong 615 and a first bottom prong 616 at end 601 of the front pad 610 and a second top prong 617 and a second bottom prong 618 at end 602 of the front pad 610.

In one embodiment, the back pad 620 can engage the first and second compression mechanism 200, 300. The back pad 620 can have a first opening 623 capable of receiving a first compression mechanism 200 and a second opening 624 capable of receiving a second compression mechanism 300. The first opening 623 can be positioned at end 603 of the back pad 620 and the second opening 624 can be positioned at end 604 of the back pad 620. In one embodiment, as shown in FIG. 4, the back pad 620 can be bifurcated having a first top prong 625 and a first bottom prong 626 at end 603 of the back pad 620 and a second top prong 627 and a second bottom prong 628 at end 604 of the back pad 600.

Figure 11:
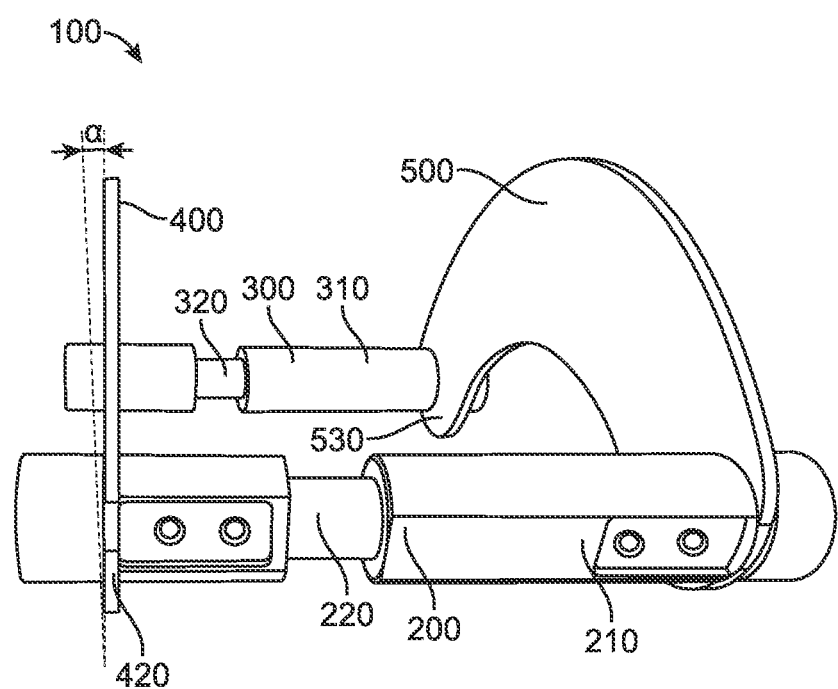
FIG. 11 is a side view of a support stand according to an exemplary embodiment.
Figure 12:
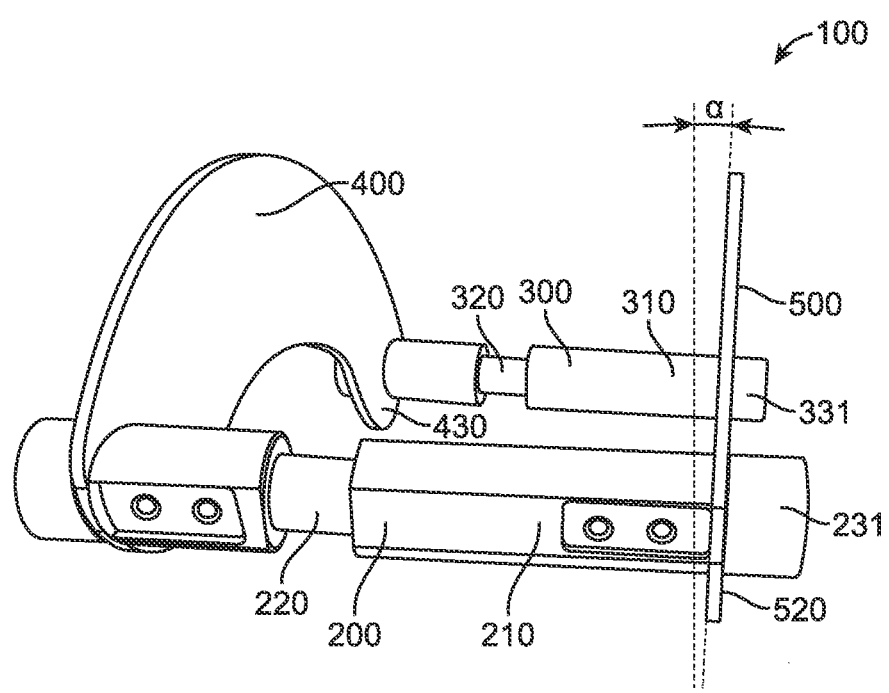
FIG. 12 is a side view of a support stand according to an exemplary embodiment.

In one embodiment, as shown in FIGS. 11-12, the front compression plate 400 and/or back compression plate 500 can extend at an angle $\alpha$ from a plane substantially perpendicular with the surface 10. While angle $\alpha$ can be any angle that prevents the guitar 1 from falling forward when the support stand 100 is placed on a surface 10, angle $\alpha$ from about 0-90 degrees, inclusive, and is preferably 3 degrees. As shown in FIGS. 11-12, a front compression plate 400 and/or back compression plate 500 with an angle $\alpha$ allows for the guitar 1 to be supported at an angle $\alpha$. In one embodiment, angle $\alpha$ is less than 90 degrees. By the guitar 1 being positioned at angle $\alpha$, the center of gravity is re-centered to the substantial middle of the guitar 1 thereby reducing the likelihood of the guitar 1 from falling forward.

Figure 13:
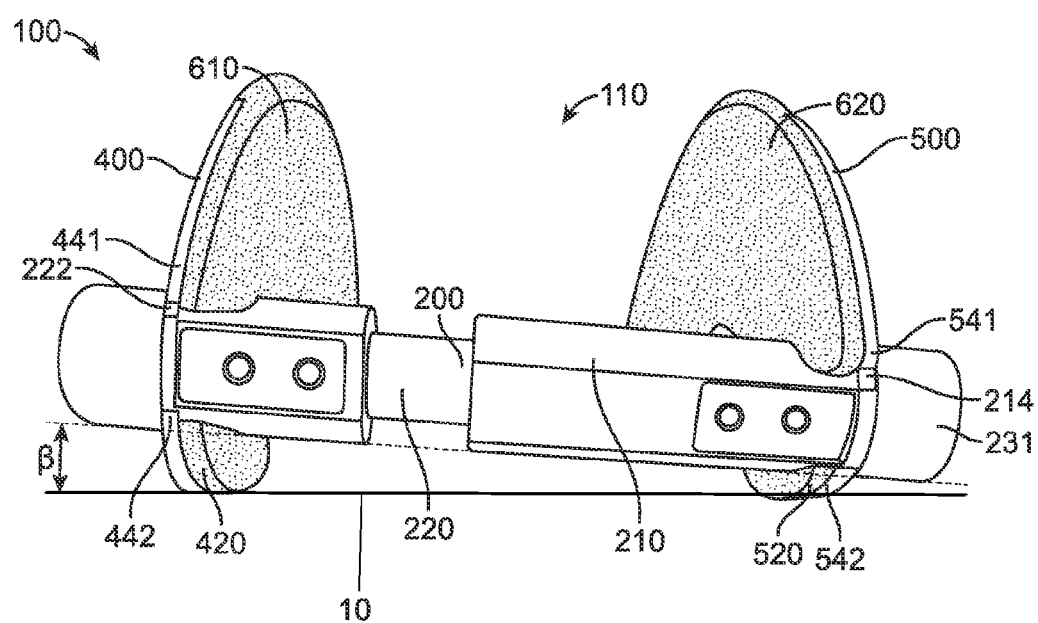
FIG. 13 is a side view of a support stand according to an exemplary embodiment.

In one embodiment, as shown in FIG. 13, the first and second compression mechanisms 200, 300 are positioned at an angle $\beta$ from a plane substantially parallel with the surface 10. In one embodiment, angle $\beta$ is from about 0-90 degrees, and is preferably 5 degrees. Here, the first and second openings 440, 450 of the front compression plate 400 are positioned at a first opening distance or the distance from the surface 10 to the first and second openings 440, 450 and the first and second openings 540, 550 of the back compression plate 500 are positioned at a second opening distance or the distance from the surface 10 to the first and second openings 540, 550. The first opening distance is greater than the second opening distance thereby allowing for the first and second compression mechanisms 200, 300 to be positioned at an angle β. This allows for the first and second compression mechanisms 200, 300 to engage the front compression plate 400 at a distance from the surface 10 that is greater than the distance between the engagement of the first and second compression mechanisms 200, 300 with the back compression plate 500 and the surface 10. This in turn results in the first and back compression plates 400, 500 extending at angle α from the surface 10.

In one embodiment, the engagement of the front compression plate 400 with the first and second compression mechanisms 200, 300 and the back compression plate 500 with the first and second compression mechanism 200, 300 defines a support stand hole 110 capable of receiving the guitar 1. In one embodiment, the support stand hole 110 receives the base of the guitar 1.

In operation, by way of example, the support stand 100 can releasably be secured to the guitar 1 by the following. The support stand hole 110 receives the base or body of the guitar 1. The front compression plate 400 engages the first rod 220 by way of the first opening 440 receiving the first rod 220 and the slot 222 receiving the first top prong 441 and first bottom prong 442. The front compression plate 400 engages the second rod 320 by way of the second opening 450 receiving the second rod 320 and the slot 322 receiving the second top prong 451 and the second bottom prong 452. The back compression plate 500 engages the first receiving member 210 by way of the first opening 540 receiving the first receiving member 210 and the slot 214 receiving the first top prong 541 and the first bottom prong 542. The back compression plate 500 engages the second receiving member 310 by way of the second opening 550 receiving the second receiving member 310 and the slot 314 receiving the second top prong 551 and the second bottom prong 552.

The first pin 230 is received by the first receiving member 210 and passes through the first receiving passageway 223 into the first rod cavity 221. The first pin 230 is screwed into the first rod cavity 221 causing the first knob 231 to exert force onto the first receiving member 210. The force applied to the first receiving member 210 causes the first receiving member 210 to slide along the first rod 220. With the first receiving member 210 engaged to the back compression plate 500, the first receiving member 210 pulls the back compression plate 500 toward the back of the guitar 1.

The second pin 330 is received by the second receiving member 310 and passes through the second receiving passageway 323 into the second rod cavity 321. The second pin 330 is screwed into the second rod cavity 321 causing the second knob 331 to exert force onto the second receiving member 310. The force applied to the second receiving member 310 causes the second receiving member 310 to slide along the second rod 320. With the second receiving member 310 engaged to the back compression plate 500, the second receiving member 310 pulls the back compression plate 500 toward the back of the guitar 1.

The first and second knobs 231, 331 are screwed into the first and second rod cavities 221, 321, respectively, thereby compressing the front compression plate 400 and the back compression plate 500 to the guitar 1. The front pad 610 being positioned between the front compression plate 400 and the guitar 1 and the back pad 620 being positioned between the back compression plate 500 and the guitar 1, the front pad 610 and back pad 620 are compressed to the guitar 1.

By compressing the front compression plate 400 and back compression plate 500 to the guitar 1, the support stand 100 is secured to the guitar 1. The guitar 1 can be placed in an upright position on the surface 10 with the leg portions 420, 430, 520, 530 touching the surface 10 and thereby suspending the guitar 1 above or off the surface 10.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

Modifications and variations of the present invention are possible in light of the above teachings. It is therefore to be understood that the invention may be practiced otherwise than as specifically described herein.

What is claimed is:

1. A support stand for supporting a stringed instrument, said support stand comprising:
   a securing mechanism,
   a front compression plate having a leg portion,
   a back compression plate,
   wherein the leg portion of the front compression plate engages the front compression plate and is configured to raise the support stand above a surface upon which the support stand is placed, wherein the front compression plate engages the securing mechanism, the back compression plate engages the securing mechanism, and the support stand supports the instrument in a generally upright position when the support stand is placed on the surface.

2. The support stand of claim 1 wherein the securing mechanism releasably secures the support stand to the stringed instrument.

3. The support stand of claim 1 wherein the securing mechanism has a first compression mechanism and a second compression mechanism.

4. The support stand of claim 3 wherein the first compression mechanism has a first receiving member, a first rod, and a first pin, wherein the first receiving member receives the first rod, and the first rod receives the first pin, and the second compression mechanism has a second receiving member, a second rod, and a second pin wherein the second receiving member receives the second rod, and the second rod receives the second pin.

5. The support stand of claim 4 wherein the first receiving member has a first receiving stop.

6. The support stand of claim 3 wherein the first compression mechanism has a first end and a second end and the second compression mechanism has a first end and a second end, wherein the front compression plate engages the first end of the first compression mechanism and the first end of the second compression mechanism, and the back compression plate engages the second end of the first compression mechanism and the second end of the second compression mechanism.

7. The support stand of claim 1 wherein the front compression plate comprises a first opening and a second opening, said first opening receiving a first rod and said second opening receiving the second rod.

8. The support stand of claim 7 wherein the first opening is positioned at a first end of the front compression plate, and the second opening is positioned at a second end of the front compression plate, the front compression plate having a first top prong, a first bottom prong, a second top prong, and a second bottom prong.

9. The support stand of claim 3 wherein the first compression mechanism comprises a slot, said slot receiving the first top prong.

10. The support stand of claim 1 wherein the support stand further comprises a front pad and back pad, said front pad engages the front compression plate and said back pad engages the back compression plate.

11. The support stand of claim 1 wherein the front compression plate and back compression plate extend upwardly at an angle, wherein said angle of the front compression plate and back compression plate prevents the instrument from falling forward when placed on a surface.

12. The support stand of claim 3 wherein the first compression mechanism and second compression mechanism are positioned at an angle from a plane substantially horizontal with the surface.

13. The support stand of claim 7 wherein the back compression plate comprises a first opening and a second opening wherein the first and second openings of the front compression plate are positioned at a first opening distance from the surface, the first and second openings of the back compression plate are positioned at a second opening distance from the surface, and the first opening distance is greater than the second opening distance.

14. The support stand of claim 1 further comprising a support stand hole defined by the first compression mechanism, second compression mechanism, front compression plate, and back compression plate, wherein the support stand hole is configured to receive the instrument so that a portion of the base of the instrument extends below the top surface of the first compression mechanism.

15. The support stand of claim 1 wherein the securing mechanism secures the support stand to the instrument when the instrument is lifted off the surface.

16. The support stand of claim 1 wherein the support stand has a low profile when the support stand is engaged to the instrument thereby allowing for a user to play the instrument without the support stand inhibiting the user from playing the instrument.

17. The support stand of claim 1 wherein the leg portion of the first compression plate raises a first end of the securing mechanism higher than a second end of the securing mechanism.

18. The support stand of claim 17 wherein the securing mechanism has a first compression mechanism and a second compression mechanism, wherein the leg portion of the first compression plate raises a first end of the first compression mechanism higher than a second end of the first compression mechanism, and wherein the leg portion of the first compression plate raises a first end of the second compression mechanism higher than a second end of the second compression mechanism.

19. The support stand of claim 1 wherein the back compression plate comprises a leg portion, wherein the leg portion of the back compression plate engages the back compression plate and is configured to raise the back compression plate above a surface upon which the support stand is placed.

* * * * *